United States Patent [19]

Muraoka et al.

[11] Patent Number: 5,624,764
[45] Date of Patent: Apr. 29, 1997

[54] COMPOSITE MATERIAL OF METAL AND RUBBER FOR USE IN INDUSTRIAL RUBBER ARTICLES

[75] Inventors: Kiyoshige Muraoka; Mamoru Uchida; Takafumi Taguchi, all of Hyogo, Japan

[73] Assignee: Sumitomo Rubber Industries, Ltd., Hyogo, Japan

[21] Appl. No.: 462,542

[22] Filed: Jun. 5, 1995

Related U.S. Application Data

[63] Continuation of Ser. No. 43,607, Apr. 5, 1993, abandoned, which is a continuation of Ser. No. 845,844, Mar. 6, 1992, abandoned, which is a continuation of Ser. No. 550,557, Jul. 10, 1990, abandoned, which is a division of Ser. No. 266,580, Nov. 3, 1988, abandoned.

[30] Foreign Application Priority Data

Nov. 7, 1987 [JP] Japan .................. 62-281777
Dec. 4, 1987 [JP] Japan .................. 62-308093

[51] Int. Cl.$^6$ .................. C08C 19/20; B32B 15/06
[52] U.S. Cl. .................. 428/462; 428/465; 525/348
[58] Field of Search .................. 428/462, 465, 428/466

[56] References Cited

U.S. PATENT DOCUMENTS

| | | |
|---|---|---|
| 3,897,583 | 7/1975 | Bellamy . |
| 4,082,909 | 4/1978 | Sugiyama . |
| 4,265,678 | 5/1981 | Hachisuka et al. . |
| 4,347,290 | 8/1982 | Haemers .................. 428/465 |
| 4,677,033 | 6/1987 | Coppens et al. . |
| 4,704,334 | 11/1987 | Delseth .................. 428/458 |

FOREIGN PATENT DOCUMENTS

| | | |
|---|---|---|
| 1182615 | 2/1985 | Canada . |
| 0008201 | 2/1980 | European Pat. Off. . |
| 0009846 | 4/1980 | European Pat. Off. . |
| 0175632 | 3/1986 | European Pat. Off. . |
| 51-8389 | 3/1976 | Japan . |
| 54-89940 | 7/1979 | Japan . |
| 55-45884 | 3/1980 | Japan . |
| 55-71887 | 5/1980 | Japan . |
| 55-105548 | 8/1980 | Japan . |
| 56-82604 | 7/1981 | Japan . |
| 60-42440 | 3/1985 | Japan . |
| 42440 | 3/1985 | Japan . |
| 61-72545 | 4/1986 | Japan . |
| 61-243194 | 10/1986 | Japan . |
| 2039580 | 8/1980 | United Kingdom . |

OTHER PUBLICATIONS

Kautschuk und Gummi–Kunststoffe, vol. 25, No. 11, 1972, pp. 531–537; specifically page 536; K. D. Albrecht.

"Rubber Chemicals" by J. Van Alphen, 1973, pp. 36–37; D. Reidel Publishing Company.

EPA 008201 Feb. 1980.

EPA 009846 Apr. 1980.

EPA 137986 Apr. 1985.

UKPA 2039580 Aug. 1980.

*Primary Examiner*—Christopher Henderson

[57] ABSTRACT

A composite material comprising a rubber composition and a metal material, wherein the rubber composition contains, per 100 parts by weight of rubber, a cobalt salt of an organic acid in an amount up to 0.5 parts by weight, 3 to 6 parts by weight of sulfur, and N-oxydiethylene-2-benzothiazolylsulfenamide or N-tert-butyl-2-benzothiazolylsulfenamide as a vulcanization accelerator, and the metal material is provided with a plating of a ternary alloy consisting of copper, zinc, and nickel.

2 Claims, No Drawings

COMPOSITE MATERIAL OF METAL AND RUBBER FOR USE IN INDUSTRIAL RUBBER ARTICLES

This application is a continuation, of application Ser. No. 08/043,607, filed on Apr. 5, 1993, which is a continuation of U.S. Ser. No. 07/845,844, filed on Mar. 6, 1992, which is a continuation of U.S. Ser. No. 07/550,557 filed Jul. 10, 1990 which is a divisional application of U.S. Ser. No. 07/266,580 filed Nov. 3, 1988, now all abandoned.

FIELD OF THE INVENTION

The present invention relates to a composite material comprising a rubber material (or composition) and a metal material. More particularly, the present invention relates to a composite material that is adapted for use in industrial rubber articles such as tires for vehicles and conveyor belts and which retains good adhesion between metal and rubber even after the latter's aging.

BACKGROUND OF THE INVENTION

The performance required of tires for vehicles, conveyor belts and other industrial rubber articles has become increasingly versatile. In the tires for vehicles, radial tires are extensively used not only as tires for passenger cars but also as tires for large cars such as trucks and buses, and the useful life of tires has been remarkably extended by several reasons including the advances in the mixing technology of tread rubber. Large tires that have been used for large cars such as trucks and buses are retreaded after the end of their primary life so that they are put to service for the secondary, and even tertiary, use. These uses sometimes extend to several hundreds thousand kilometers and the belts and carcasses of tires on vehicles are required to perform satisfactorily for this period.

In the above radial tires, rubber-coated steel cords are used to form the belts or carcasses in order to improve the steering stability, structural durability, wear resistance and puncture resistance of the tires. With such tires, the adhesion between rubber material and metal material can be a problem.

Rubber material normally adheres to metal material, when sulfur mixed in the rubber material during vulcanization, reacts with copper in the plating on the metal material so as to form a sulfide at the rubber-metal interface. When a tire is rolling on the road, hysteresis loss of the rubber material generates heat, and if the generated heat is large adhesion between the rubber material and the metal material is broken, and the coated rubber separates from the steel cord and this "separation" renders further rolling of the tire on the road impossible.

Further, the tire tread or sidewall may sometimes be damaged when the tire is rolling on the road. If the damage is deep enough to reach the steel cord, moisture that has permeated the tire through the damaged part will be vaporized by the heat generated during tire rolling on the road, and the vapor (getting into the space between filaments in the steel cord) will destroy the adhesion between the steel cord and the coated rubber, thereby inducing "separation".

A further problem will occur if the tire is inflated with moisture containing air. The moisture will penetrate through innerliner of the tire to reach the steel cord and this may induce "separation" by breaking the adhesion between the coated rubber and the steel cord.

With a view to avoiding these phenomena, various techniques have been proposed that are chiefly intended to improve the adhesion between the rubber and the steel cords. One of the techniques proposed concerns the compounding techniques of rubber material with which steel cords are coated. It was discovered as early as in the nineteen-fifties that the adhesion between the rubber and the steel cords could be improved by incorporating cobalt salts of organic acids in the rubber material, and many studies have been conducted regarding the quantity and type of such the cobalt salts to be added. For example, JP-A-60-42440 (the term "JP-A" as used herein refers to a "published unexamined Japanese patent application") shows that improved adhesion can be attained by optimizing the quantities of sulfur and cobalt salts of organic acids. Another approach has been to use the HRH based composition mixing white carbon, resorcin and hexamethylenetetramine. Drawbacks of the above cobalt method include that if cobalt salts of organic acids are added in large amounts, unvulcanized rubber will be deteriorated, or the deterioration of adhesive power due to thermal aging will occur, either on account of hot or prolonged vulcanization or rolling of the tire on the road for a distance of many hundred kilometers. The HRH composition's principal drawbacks are that they cause problems during production such as environmental pollution and rubber scorching.

The second approach that has been taken to improve the adhesion between the rubber and the steel cords is directed at the plating layer to be deposited on a metal material. JP-B-51-8389 (the term "JP-B" as used herein refers to an "examined Japanese patent publication") and JP-A-55-105548 disclose a plating layer containing nickel. Alloy platings containing three or four metals are disclosed in JP-A-55-45884, JP-A-55-71887, JP-A-55-105548, JP-A-56-82604, JP-A-54-89940, JP-A-61-243194, JP-A-61-72545, etc.

SUMMARY OF THE INVENTION

An object of the present invention is to provide a composite material comprising a rubber composition (material) and a metal material that is successfully improved over the prior art not only in adhesion after thermal aging but also in adhesion after wet heat aging (hereinafter referred to as "heat resistance" and "wet heat resistance", respectively) without causing other problems, in particular, those which have conventionally been encountered during production. This object of the present invention is attained by combining a metal material having an improved plating layer and a rubber material having a compound formulation suitable for this metal material. More specifically, the present invention provides a composite material comprising a rubber composition and a metal material, wherein the rubber composition contains, per 100 parts by weight of rubber, 0 to 0.5 part by weight of a cobalt salt of an organic acid, 3 to 6 parts by weight of sulfur, and N-oxydiethylene-2-benzothiazolylsulfenamide or N-tert-butyl-2-benzothiazolylsulfenamide as a vulcanization accelerator, and the metal material is provided with a plating of a ternary alloy consisting of copper, zinc, and nickel.

DETAILED DESCRIPTION OF THE INVENTION

Examples of the cobalt salts of organic acids that can be used in the present invention include cobalt naphthenate, cobalt oleate, cobalt maleate and cobalt stearate. In order to ensure high initial strength of adhesion, these cobalt salts of organic acids preferably contain cobalt in an amount of 8 to 10 wt %.

The shape of the metal material can be freely chosen in accordance with the type of industrial article to which the composite material of the present invention is applied. If it is applied to conveyor belts or tires for vehicles, the metal material is preferably used in the form of cords, particularly in the form of steel cords.

It has generally been held that high initial strength of adhesion is not attainable unless cobalt salts of organic acids are used in amounts exceeding 0.5 part by weight per 100 parts by weight of rubber. However, in accordance with the present invention, N-oxydiethylene-2-benzothiazolylsulfenamide or N-tert-butyl-2-benzothiazolylsulfenamide is added to rubber as a vulcanization accelerator and the resulting rubber composition is combined with a metal material provided with a plating of a ternary alloy consisting of copper, zinc or nickel, and this ensures satisfactory strength of adhesion even if a cobalt salt of an organic acid is present in an amount of not more than 0.5 part by weight, and particularly the satisfactory strength of adhesion is ensured even in an extreme case where such the cobalt salts of organic acids are entirely absent. Therefore, the present invention is capable of avoiding the problems during production and aging after vulcanization which have occurred in the prior art on account of the incorporation of cobalt salts of organic acids in large amounts.

If the rubber composition of the present invention contains less than 3 parts by weight of sulfur, satisfactory initial strength of adhesion is not attainable. If the sulfur content exceeds 6 parts by weight, the heat resistance of the resulting composite material will be impaired. Accordingly, the amount of sulfur used in the rubber composition of the present invention is generally 3 to 6 parts by weight and preferably 3.5 to 5.5 parts by weight, per 100 parts by weight of rubber.

The vulcanization accelerator is preferably used in the present invention in an amount of from 0.5 to 2 parts by weight and more preferably from 0.5 to 1.5 parts by weight, per 100 parts by weight of rubber. If the vulcanization accelerator is incorporated in an amount of less than 0.5 part by weight, the speed of vulcanization tends to be slow and poor adhesion often results. If the content of the vulcanization accelerator exceeds 2 parts by weight, the modulus of the rubber becomes so high as to occasionally cause adverse effects on the adhesion between the rubber material and the metal material or the breaking strength of the rubber itself.

The metal material of the composite material of the present invention must be plated with a ternary alloy consisting of copper, zinc and nickel. An advantageous composition of this plating alloy consists of 60 to 75 wt % copper, 4 to 10 wt % nickel and the balance being zinc. If the copper content is less than 60 wt %, desired initial strength of adhesion is not attainable. If copper is present in an amount exceeding 75 wt %, the contents of nickel and zinc are too much reduced to ensure satisfactory heat and wet heat resistance. Nickel need not be present in a large amount and a required minimum amount is preferably 4 wt %. If the nickel content exceeds 10 wt %, the reaction of adhesion is inhibited and the necessary initial strength of adhesion is difficult to obtain.

The following example is provided for the purpose of further illustrating the present invention but the present invention is not to be construed as being limited thereto.

EXAMPLE

Rubber compositions having the basic mixing preparation (recipe) shown in Table 1 were prepared by varying the amounts of sulfur and cobalt stearate as well as the type and amount of vulcanization accelerator, as shown in Table 2.

TABLE 1

| Ingredients | Parts by weight |
| --- | --- |
| Natural rubber | 100 |
| HAF (High Abrasion Furnance) | 50 |
| Zinc white (ZnO) | 8 |
| Antiaging agent* | 2 |
| Cobalt stearate** | Variable (see Table 2) |
| Sulfur | Variable (see Table 2) |
| Vulcanization accelerator | Variable (see Table 2) |

*2,2,4-Trimethyl-1,2-dihydroquinoline polymer
**Cobalt content = 9 wt %

In Table 2, Rubber Composition Nos. 1 to 18 were those prepared in accordance with the present invention.

TABLE 2

| | Rubber Composition (mixing ratio) | | | |
| --- | --- | --- | --- | --- |
| Sample No. | Cobalt Stearate Amount (pts. by wt.) | Sulfur Amount (pts. by wt.) | Vulcanization Accelerator Type* | Amount (pts. by wt.) |
| 1 | 0 | 3.5 | A | 1.0 |
| 2 | 0 | 4.5 | " | 1.0 |
| 3 | 0 | 5.5 | " | 1.0 |
| 4 | 0.5 | 3.5 | " | 1.0 |
| 5 | 0.5 | 4.5 | " | 1.0 |
| 6 | 0.5 | 5.5 | " | 1.0 |
| 7 | 0 | 3.5 | B | 1.0 |
| 8 | 0 | 4.5 | " | 1.0 |
| 9 | 0 | 5.5 | " | 1.0 |
| 10 | 0.5 | 3.5 | " | 1.0 |
| 11 | 0.5 | 4.5 | " | 1.0 |
| 12 | 0.5 | 5.5 | " | 1.0 |
| 13 | 0 | 4.5 | A | 0.5 |
| 14 | 0 | 4.5 | " | 2.0 |
| 15 | 0 | 4.5 | " | 2.5 |
| 16 | 0 | 4.5 | B | 0.5 |
| 17 | 0 | 4.5 | " | 2.0 |
| 18 | 0 | 4.5 | " | 2.5 |
| 19 | 1.0 | 3.0 | C | 1.0 |
| 20 | 1.0 | 3.5 | " | 1.0 |
| 21 | 1.0 | 5.0 | " | 1.0 |
| 22 | 1.0 | 5.5 | C | 1.0 |
| 23 | 1.0 | 6.5 | " | 1.0 |
| 24 | 1.0 | 7.0 | " | 1.0 |
| 25 | 1.5 | 2.5 | " | 1.0 |
| 26 | 1.5 | 4.5 | " | 1.0 |
| 27 | 1.5 | 6.5 | " | 1.0 |
| 28 | 2.0 | 3.5 | " | 1.0 |
| 29 | 2.0 | 4.0 | " | 1.0 |
| 30 | 2.0 | 5.5 | " | 1.0 |
| 31 | 2.0 | 6.0 | " | 1.0 |
| 32 | 2.5 | 2.5 | " | 1.0 |
| 33 | 2.5 | 4.5 | " | 1.0 |
| 34 | 3.0 | 3.0 | " | 1.0 |
| 35 | 3.0 | 5.0 | " | 1.0 |
| 36 | 3.0 | 7.0 | " | 1.0 |
| 37 | 4.0 | 4.0 | " | 1.0 |
| 38 | 4.0 | 6.0 | " | 1.0 |
| 39 | 5.0 | 3.0 | " | 1.0 |
| 40 | 5.0 | 5.0 | " | 1.0 |
| 41 | 5.0 | 7.0 | " | 1.0 |
| 42 | 0 | 4.0 | " | 1.0 |
| 43 | 0 | 5.5 | " | 1.0 |
| 44 | 0 | 6.0 | C | 1.0 |
| 45 | 0 | 7.0 | " | 1.0 |
| 46 | 0.5 | 2.5 | " | 1.0 |
| 47 | 0.5 | 6.5 | " | 1.0 |

TABLE 2-continued

| Sample No. | Rubber Composition (mixing ratio) | | | |
|---|---|---|---|---|
| | Cobalt Stearate Amount (pts. by wt.) | Sulfur Amount (pts. by wt.) | Vulcanization Accelerator Type* | Amount (pts. by wt.) |
| 48 | 2.0 | 8.0 | " | 1.0 |
| 49 | 4.0 | 9.0 | " | 1.0 |
| 50 | 6.0 | 6.0 | " | 1.0 |
| 51 | 7.0 | 4.0 | " | 1.0 |
| 52 | 7.0 | 10.0 | " | 1.0 |

*A: N-Oxydiethylene-2-benzothiazolylsulfenamide (Invention)
B: N-tert-Butyl-2-benzothiazolylsulfenamide (Invention)
C: N,N-Dicyclohexyl-2-benzothiazolylsulfenamide (Comparison)

Subsequently, steel cords (1×5/0.25) were plated with alloys having the compositions shown in Table 3.

TABLE 3

| Steel Cord Sample No. | Composition of Plating Alloy (wt %) | | | Remarks |
|---|---|---|---|---|
| | Copper | Zinc | Nickel | |
| A | 65 | 35 | 0 | Comparison |
| B | 65 | 33 | 2 | Invention |
| C | 65 | 31 | 4 | " |
| D | 65 | 29 | 6 | " |
| E | 65 | 27 | 8 | " |
| F | 65 | 25 | 10 | " |
| G | 65 | 10 | 25 | " |
| H | 65 | 5 | 35 | " |

The rubber compositions shown in Table 2 were combined in various ways with the steel cords shown in Table 3 and the resulting mixing compositions were vulcanized under predetermined conditions, followed by aging under the conditions shown in Table 4. Thereafter, the rubber material was peeled apart mechanically from the cords and the peel force, i.e., the force required to cause separation between the rubber and the cord, was measured. At the same time, the state of rubber adhered to the surface of cords was visually evaluated on a 10-point scoring basis. The results are shown in Table 5, as well as in Table 6. The greater the values shown in these tables, the better are the results.

TABLE 4

| Aging Condition | Aging Condition | | |
|---|---|---|---|
| | Time (hr) | Temperature (°C.) | Relative Humidity (%) |
| (a) | 0 | — | — |
| (b) | 400 | 80 | 95 |
| (c) | 24 | 120 | 100 |
| (d) | 96 | 120 | — |

Condition (a) was used for measuring the initial strength of adhesion; conditions (b) and (c) were used for measuring wet heat resistance; and condition (d) was used for measuring heat resistance.

Among the combinations shown in Table 5 and Table 6, those consisting of Rubber Composition Samples 1 to 18 and Steel Cord Samples B to H provided composite materials within the scope of the present invention.

Table 5 shows the results of visual evaluation of rubber adhesion on a 10-point scoring basis and the greater the values shown in these tables, the better are the results.

Table 6 shows the results of measurements of peeling force.

TABLE 5

(State of Rubber Adhesion)

| Steel Cord | Test Condition | Rubber Composition | | | | | | | | | | | | | | | | | | | | | | | | | |
|---|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| A | (a) | — | 10 | — | — | 10 | — | 6 | 7 | 8 | 7 | 8 | 9 | 8 | 10 | 7 | 8 | 8 | 7 | 9 | 9 | 10 | 10 | 10 | 10 | 9 | 10 |
| | (b) | — | 10 | — | — | 10 | — | 6 | 7 | 7 | 7 | 7 | 8 | 7 | 8 | 7 | 7 | 7 | 7 | 5 | 8 | 5 | 8 | 8 | 6 | 8 | 8 |
| | (c) | — | 7 | — | — | 8 | — | 4 | 5 | 5 | 6 | 7 | 7 | 6 | 7 | 6 | 6 | 6 | 6 | 5 | 8 | 6 | 9 | 8 | 6 | 7 | 6 |
| | (d) | — | 6 | — | — | 6 | — | 6 | 6 | 6 | 6 | 6 | 5 | 6 | 6 | 6 | 6 | 5 | 6 | 7 | 7 | 7 | 7 | 7 | 6 | 5 | 5 |
| B | (a) | 10 | 10 | — | — | 10 | — | — | — | — | — | — | — | — | 10 | — | — | 9 | — | 9 | — | 10 | — | — | 10 | — | — |
| | (b) | 9 | 10 | — | — | 10 | — | — | — | — | — | — | — | — | 9 | — | — | 9 | — | 4 | — | 5 | — | — | 5 | — | — |
| | (c) | 7 | 8 | — | — | 9 | — | — | — | — | — | — | — | — | 8 | — | — | 8 | — | 8 | — | 8 | — | — | 6 | — | — |
| | (d) | 7 | 7 | — | — | 6 | — | — | — | — | — | — | — | — | 6 | — | — | 6 | — | 7 | — | 8 | — | — | 6 | — | — |
| C | (a) | 10 | 10 | 10 | — | 10 | — | 10 | 10 | 10 | — | — | — | — | 10 | — | — | 9 | — | 8 | — | 10 | — | — | 10 | — | — |
| | (b) | 10 | 10 | 10 | — | 10 | — | 10 | 10 | 10 | — | — | — | — | 10 | — | — | 10 | — | 5 | — | 7 | — | — | 7 | — | — |
| | (c) | 9 | 10 | 10 | — | 10 | — | 9 | 10 | 10 | — | — | — | — | 10 | — | — | 9 | — | 7 | — | 9 | — | — | 7 | — | — |
| | (d) | 9 | 10 | 10 | — | 10 | — | 10 | 10 | 10 | — | — | — | — | 10 | — | — | 10 | — | 8 | — | 9 | — | — | 6 | — | — |
| D | (a) | 9 | 10 | 10 | 10 | 10 | 10 | 9 | 10 | 10 | 9 | 10 | 10 | 10 | 10 | 10 | 10 | 10 | 10 | 8 | 10 | 10 | 9 | 9 | 9 | 7 | 8 |
| | (b) | 10 | 10 | 10 | 10 | 10 | 9 | 10 | 10 | 10 | 10 | 10 | 10 | 10 | 10 | 10 | 10 | 10 | 10 | 4 | 9 | 9 | 10 | 10 | 6 | 8 | 8 |
| | (c) | 9 | 10 | 10 | 10 | 10 | 10 | 9 | 10 | 10 | 10 | 10 | 10 | 10 | 10 | 10 | 10 | 10 | 10 | 8 | 9 | 10 | 9 | 9 | 8 | 8 | 9 |
| | (d) | 9 | 10 | 10 | 10 | 10 | 10 | 10 | 10 | 10 | 10 | 10 | 10 | 10 | 10 | 10 | 10 | 10 | 10 | 8 | 7 | 9 | 7 | 7 | 6 | 6 | 7 |
| E | (a) | 9 | 10 | 10 | — | 10 | — | 10 | 10 | 10 | — | — | — | — | 10 | — | — | 10 | — | 7 | — | 10 | — | — | 9 | — | — |
| | (b) | 10 | 10 | 10 | — | 10 | — | 10 | 10 | 10 | — | — | — | — | 10 | — | — | 10 | — | 6 | — | 8 | — | — | 6 | — | — |
| | (c) | 10 | 10 | 10 | — | 10 | — | 10 | 10 | 10 | — | — | — | — | 10 | — | — | 10 | — | 6 | — | 10 | — | — | 8 | — | — |
| | (d) | 9 | 10 | 10 | — | 10 | — | 10 | 10 | 10 | — | — | — | — | 10 | — | — | 10 | — | 7 | — | 9 | — | — | 6 | — | — |
| F | (a) | 9 | 9 | 10 | — | 10 | — | 9 | 10 | 10 | — | — | — | — | 9 | — | — | 9 | — | 6 | — | 10 | — | — | — | — | — |
| | (b) | 9 | 10 | 10 | — | 10 | — | 10 | 10 | 10 | — | — | — | — | 10 | — | — | 9 | — | 5 | — | 7 | — | — | — | — | — |
| | (c) | 10 | 10 | 10 | — | 10 | — | 10 | 10 | 10 | — | — | — | — | 10 | — | — | 10 | — | 5 | — | 9 | — | — | — | — | — |
| | (d) | 9 | 9 | 10 | — | 10 | — | 10 | 10 | 10 | — | — | — | — | 10 | — | — | 10 | — | 6 | — | 9 | — | — | — | — | — |
| G | (a) | — | — | — | — | 8 | — | — | — | 5 | — | — | — | 6 | 7 | 7 | 6 | 6 | 7 | — | — | — | 7 | — | — | — | — |
| | (b) | — | — | — | — | 6 | — | — | — | 7 | — | — | — | 7 | 7 | 7 | 7 | 7 | 7 | — | — | — | 8 | — | — | — | — |
| | (c) | — | — | — | — | 6 | — | — | — | 6 | — | — | — | 6 | 6 | 6 | 6 | 6 | 6 | — | — | — | 8 | — | — | — | — |
| | (d) | — | — | — | — | 5 | — | — | — | 6 | — | — | — | 6 | 6 | 6 | 6 | 6 | 6 | — | — | — | 5 | — | — | — | — |

TABLE 5-continued (State of Rubber Adhesion)

| H | (a) | — | — | — | — | 6 | — | — | — | — | — | — | — | — | 5 | — | — | 5 | — | — | — | — | — | — | — | — |
|---|-----|---|---|---|---|---|---|---|---|---|---|---|---|---|---|---|---|---|---|---|---|---|---|---|---|---|
|   | (b) | — | — | — | — | 6 | — | — | — | — | — | — | — | — | 6 | — | — | 5 | — | — | — | — | — | — | — | — |
|   | (c) | — | — | — | — | 5 | — | — | — | — | — | — | — | — | 6 | — | — | 5 | — | — | — | — | — | — | — | — |
|   | (d) | — | — | — | — | 5 | — | — | — | — | — | — | — | — | 5 | — | — | 5 | — | — | — | — | — | — | — | — |

| Steel Cord | Test Condition | Rubber Composition |||||||||||||||||||||||||||
|---|---|---|---|---|---|---|---|---|---|---|---|---|---|---|---|---|---|---|---|---|---|---|---|---|---|---|
| | | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 |
| A | (a) | 10 | 10 | 10 | 10 | 10 | 9 | 9 | 9 | 10 | 10 | 9 | 10 | 9 | 9 | 9 | 9 | 7 | 10 | 9 | 7 | 8 | 10 | 9 | 9 | 8 | 7 |
|   | (b) | 9 | 8 | 7 | 8 | 9 | 7 | 7 | 5 | 8 | 7 | 6 | 7 | 4 | 4 | 2 | 1 | 6 | 1 | 9 | 9 | 8 | 7 | 4 | 3 | 1 | 1 |
|   | (c) | 6 | 5 | 5 | 5 | 6 | 5 | 4 | 6 | 7 | 7 | 4 | 4 | 2 | 2 | 1 | 1 | 5 | 1 | 9 | 9 | 8 | 3 | 1 | 4 | 1 | 1 |
|   | (d) | 4 | 4 | 6 | 4 | 6 | 4 | 4 | 5 | 5 | 4 | 4 | 3 | 2 | 1 | 1 | 8 | 5 | 7 | 7 | 8 | 7 | 2 | 1 | 1 | 1 | 1 |
| B | (a) | — | — | 10 | — | 10 | — | — | 9 | 10 | 10 | 9 | 10 | 8 | 10 | 10 | 8 | — | 9 | — | — | — | 10 | 9 | 9 | 9 | 6 |
|   | (b) | — | — | 8 | — | 9 | — | — | 6 | 7 | 7 | 7 | 6 | 4 | 3 | 3 | 1 | — | 2 | — | — | — | 7 | 5 | 4 | 1 | 1 |
|   | (c) | — | — | 8 | — | 7 | — | — | 3 | 4 | 4 | 5 | 6 | 2 | 2 | 2 | 1 | — | 1 | — | — | — | 4 | 1 | 5 | 3 | 1 |
|   | (d) | — | — | 7 | — | 6 | — | — | 4 | 4 | 4 | 3 | 3 | 2 | 2 | 2 | 8 | — | 4 | — | — | — | 2 | 1 | 2 | 1 | 1 |
| C | (a) | — | — | 10 | — | 10 | — | — | 8 | 10 | 10 | 9 | 10 | 8 | 10 | 10 | 7 | — | 9 | — | — | — | 10 | 9 | 9 | 8 | 6 |
|   | (b) | — | — | 8 | — | 9 | — | — | 6 | 7 | 6 | 7 | 6 | 5 | 5 | 4 | 1 | — | 2 | — | — | — | 6 | 5 | 4 | 2 | 1 |
|   | (c) | — | — | 7 | — | 7 | — | — | 3 | 4 | 4 | 5 | 6 | 2 | 2 | 2 | 1 | — | 1 | — | — | — | 4 | 1 | 5 | 2 | 1 |
|   | (d) | — | — | 6 | — | 6 | — | — | 4 | 4 | 4 | 3 | 2 | 2 | 2 | 2 | 7 | — | 7 | — | — | — | 1 | 1 | 2 | 1 | 1 |
| D | (a) | 8 | 9 | 10 | 8 | 10 | 9 | 9 | 8 | 10 | 10 | 9 | 9 | 8 | 10 | 10 | 7 | 6 | 8 | 7 | 6 | 10 | 9 | 8 | 9 | 8 | 6 |
|   | (b) | 8 | 7 | 8 | 7 | 9 | 6 | 7 | 5 | 6 | 6 | 8 | 7 | 5 | 6 | 5 | 2 | 7 | 2 | 9 | 9 | 9 | 7 | 5 | 4 | 2 | 1 |
|   | (c) | 8 | 7 | 7 | 6 | 7 | 7 | 6 | 3 | 4 | 4 | 6 | 6 | 2 | 2 | 2 | 1 | 8 | 2 | 9 | 9 | 9 | 4 | 1 | 6 | 2 | 1 |
|   | (d) | 6 | 6 | 7 | 6 | 6 | 5 | 6 | 3 | 4 | 4 | 3 | 2 | 2 | 2 | 2 | 7 | 7 | 7 | 6 | 7 | 8 | 2 | 1 | 1 | 1 | 1 |
| E | (a) | — | — | 10 | — | 10 | — | — | 8 | 10 | 10 | 9 | 9 | 7 | 10 | 10 | 6 | — | 8 | — | — | — | 9 | 8 | 8 | 8 | 6 |
|   | (b) | — | — | 7 | — | 8 | — | — | 6 | 6 | 6 | 8 | 7 | 5 | 7 | 5 | 2 | — | 2 | — | — | — | 7 | 5 | 3 | 2 | 1 |
|   | (c) | — | — | 8 | — | 8 | — | — | 3 | 5 | 5 | 6 | 7 | 2 | 2 | 2 | 1 | — | 7 | — | — | — | 4 | 1 | 5 | 3 | 1 |
|   | (d) | — | — | 6 | — | 5 | — | — | 4 | 4 | 4 | 3 | 3 | 2 | 2 | 2 | 6 | — | 7 | — | — | — | 2 | 1 | 2 | 1 | 1 |
| E | (a) | — | — | 10 | — | 9 | — | — | 8 | 10 | 10 | 8 | 9 | 7 | 10 | 10 | 6 | — | 7 | — | — | — | 8 | 7 | 8 | 8 | 6 |
|   | (b) | — | — | 7 | — | 8 | — | — | 4 | 5 | 6 | 8 | 7 | 5 | 8 | 5 | 2 | — | 2 | — | — | — | 7 | 3 | 2 | 2 | 1 |
|   | (c) | — | — | 8 | — | 9 | — | — | 4 | 4 | 4 | 6 | 7 | 3 | 2 | 2 | 1 | — | 2 | — | — | — | 3 | 1 | 5 | 2 | 1 |
|   | (d) | — | — | 7 | — | 4 | — | — | 4 | 5 | 5 | 2 | 3 | 2 | 2 | 2 | 6 | — | 5 | — | — | — | 2 | 1 | 1 | 2 | 1 |
| G | (a) | — | — | 4 | — | — | — | — | — | — | — | 5 | 6 | 7 | 8 | 7 | — | 4 | — | — | — | — | — | — | — | — | — |
|   | (b) | — | — | 5 | — | — | — | — | — | — | — | 7 | 7 | 7 | 7 | 7 | — | 5 | — | — | — | — | — | — | — | — | — |
|   | (c) | — | — | 5 | — | — | — | — | — | — | — | 6 | 6 | 6 | 6 | 6 | — | 5 | — | — | — | — | — | — | — | — | — |
|   | (d) | — | — | 4 | — | — | — | — | — | — | — | 6 | 6 | 6 | 6 | 6 | — | 5 | — | — | — | — | — | — | — | — | — |
| H | (a) | — | — | — | — | — | — | — | — | — | — | — | — | — | — | — | — | — | — | — | — | — | — | — | — | — | — |
|   | (b) | — | — | — | — | — | — | — | — | — | — | — | — | — | — | — | — | — | — | — | — | — | — | — | — | — | — |
|   | (c) | — | — | — | — | — | — | — | — | — | — | — | — | — | — | — | — | — | — | — | — | — | — | — | — | — | — |
|   | (d) | — | — | — | — | — | — | — | — | — | — | — | — | — | — | — | — | — | — | — | — | — | — | — | — | — | — |

TABLE 6

(Peeling Force: kgf/cm$^2$)

| Steel Cord | Test Condition | Rubber Composition |||||||||||||||
|---|---|---|---|---|---|---|---|---|---|---|---|---|---|---|---|
| | | 1 | 2 | 3 | 4 | 5 | 6 | 8 | 9 | 10 | 13 | 14 | 15 | 16 | 17 |
| A | (a) | — | 6.2 | — | — | 6.3 | — | — | 5.7 | — | 5.9 | 6.3 | 6.3 | 5.8 | 5.7 |
|   | (b) | — | 5.4 | — | — | 5.4 | — | — | 4.3 | — | 5.0 | 5.1 | 4.8 | 4.2 | 4.1 |
|   | (c) | — | 4.5 | — | — | 4.9 | — | — | 3.1 | — | 4.6 | 4.5 | 4.0 | 3.2 | 3.0 |
|   | (d) | — | 3.6 | — | — | 3.5 | — | — | 3.2 | — | 3.5 | 3.0 | 2.8 | 3.2 | 2.8 |
| B | (a) | — | 6.2 | — | — | 6.2 | — | — | — | — | — | 6.2 | — | — | 6.0 |
|   | (b) | — | 5.4 | — | — | 5.5 | — | — | — | — | — | 5.4 | — | — | 5.2 |
|   | (c) | — | 4.9 | — | — | 4.9 | — | — | — | — | — | 4.7 | — | — | 4.7 |
|   | (d) | — | 3.8 | — | — | 3.6 | — | — | — | — | — | 3.5 | — | — | 3.3 |
| C | (a) | 6.1 | 6.2 | 6.3 | — | 6.3 | — | 6.1 | 6.2 | 6.3 | — | 6.3 | — | — | 6.2 |
|   | (b) | 5.4 | 5.4 | 5.4 | — | 5.5 | — | 5.3 | 5.3 | 5.4 | — | 5.5 | — | — | 5.4 |
|   | (c) | 5.0 | 5.0 | 5.1 | — | 5.0 | — | 5.1 | 5.0 | 5.1 | — | 4.9 | — | — | 4.8 |
|   | (d) | 4.5 | 4.5 | 4.3 | — | 4.4 | — | 4.5 | 4.6 | 4.4 | — | 4.3 | — | — | 4.5 |
| D | (a) | 6.0 | 6.2 | 6.3 | 6.3 | 6.4 | 6.5 | 6.1 | 6.2 | 6.3 | — | 6.3 | — | — | 6.3 |
|   | (b) | 5.3 | 5.4 | 5.5 | 5.5 | 5.5 | 5.4 | 5.2 | 5.0 | 5.0 | — | 5.4 | — | — | 5.3 |
|   | (c) | 5.2 | 5.0 | 5.2 | 5.2 | 5.0 | 5.1 | 5.3 | 5.2 | 5.1 | — | 5.1 | — | — | 5.0 |
|   | (d) | 4.5 | 4.5 | 4.5 | 4.5 | 4.4 | 4.3 | 4.5 | 4.6 | 4.4 | — | 4.4 | — | — | 4.5 |
| E | (a) | 6.0 | 6.2 | 6.3 | — | 6.5 | — | 6.0 | 6.1 | 6.3 | — | 6.5 | — | — | 6.3 |
|   | (b) | 5.4 | 5.4 | 5.4 | — | 5.3 | — | 5.3 | 5.4 | 5.2 | — | 5.4 | — | — | 5.4 |
|   | (c) | 5.1 | 5.1 | 5.1 | — | 5.0 | — | 5.1 | 5.0 | 5.1 | — | 5.1 | — | — | 5.0 |
|   | (d) | 4.6 | 4.6 | 4.4 | — | 4.5 | — | 4.5 | 4.6 | 4.3 | — | 4.4 | — | — | 4.3 |
| F | (a) | 5.8 | 6.0 | 6.3 | — | 6.4 | — | 5.9 | 6.0 | 6.2 | — | 6.4 | — | — | 6.3 |
|   | (b) | 5.3 | 5.3 | 5.4 | — | 5.4 | — | 5.3 | 5.4 | 5.3 | — | 5.2 | — | — | 5.1 |
|   | (c) | 5.0 | 5.0 | 5.1 | — | 5.1 | — | 5.1 | 5.1 | 5.2 | — | 5.0 | — | — | 5.0 |
|   | (d) | 4.3 | 4.4 | 4.2 | — | 4.5 | — | 4.3 | 4.4 | 4.2 | — | 4.3 | — | — | 4.2 |

TABLE 6-continued (Peeling Force: kgf/cm²)

| | | | | | | | | | | | | | |
|---|---|---|---|---|---|---|---|---|---|---|---|---|---|
| G | (a) | — | 5.5 | — | — | 5.7 | — | — | 5.0 | — | — | 5.5 | — | — | 5.4 |
| | (b) | — | 4.4 | — | — | 4.2 | — | — | 4.4 | — | — | 4.4 | — | — | 4.4 |
| | (c) | — | 4.5 | — | — | 4.2 | — | — | 3.4 | — | — | 4.0 | — | — | 4.0 |
| | (d) | — | 3.4 | — | — | 3.1 | — | — | 3.3 | — | — | 3.1 | — | — | 3.0 |
| H | (a) | — | 5.0 | — | — | 5.3 | — | — | — | — | — | 5.2 | — | — | 5.3 |
| | (b) | — | 4.2 | — | — | 4.0 | — | — | — | — | — | 4.0 | — | — | 4.1 |
| | (c) | — | 4.3 | — | — | 3.9 | — | — | — | — | — | 3.9 | — | — | 3.8 |
| | (d) | — | 3.0 | — | — | 2.9 | — | — | — | — | — | 2.9 | — | — | 2.8 |

| Steel Cord | Test Condition | Rubber Composition | | | | | | | | | | | | |
|---|---|---|---|---|---|---|---|---|---|---|---|---|---|---|
| | | 18 | 20 | 22 | 23 | 25 | 26 | 27 | 30 | 32 | 33 | 43 | 45 | 46 | 47 |
| A | (a) | 5.7 | — | 6.2 | — | — | — | — | — | — | — | 5.5 | — | — | — |
| | (b) | 4.0 | — | 4.8 | — | — | — | — | — | — | — | 4.2 | — | — | — |
| | (c) | 2.9 | — | 5.0 | — | — | — | — | — | — | — | 3.1 | — | — | — |
| | (d) | 2.5 | — | 3.7 | — | — | — | — | — | — | — | 3.0 | — | — | — |
| B | (a) | — | — | — | — | — | — | — | — | — | — | — | — | — | — |
| | (b) | — | — | — | — | — | — | — | — | — | — | — | — | — | — |
| | (c) | — | — | — | — | — | — | — | — | — | — | — | — | — | — |
| | (d) | — | — | — | — | — | — | — | — | — | — | — | — | — | — |
| C | (a) | — | — | — | — | — | — | — | — | — | — | — | — | — | — |
| | (b) | — | — | — | — | — | — | — | — | — | — | — | — | — | — |
| | (c) | — | — | — | — | — | — | — | — | — | — | — | — | — | — |
| | (d) | — | — | — | — | — | — | — | — | — | — | — | — | — | — |
| D | (a) | — | 6.2 | 6.0 | 6.3 | 6.2 | 6.3 | 6.1 | 6.0 | 6.9 | 6.0 | 5.3 | 6.2 | 5.7 | 6.3 |
| | (b) | — | 4.6 | 5.1 | 4.3 | 4.7 | 4.5 | 4.4 | 4.0 | 4.2 | 3.9 | 4.4 | 4.7 | 4.9 | 4.5 |
| | (c) | — | 5.0 | 5.0 | 5.2 | 5.0 | 5.0 | 5.0 | 5.2 | 5.2 | 5.0 | 5.0 | 5.0 | 5.0 | 5.2 |
| | (d) | — | 4.0 | 3.7 | 4.0 | 3.6 | 4.2 | 3.1 | 3.1 | 3.0 | 2.9 | 3.8 | 4.0 | 4.1 | 3.2 |
| E | (a) | — | — | — | — | — | — | — | — | — | — | — | — | — | — |
| | (b) | — | — | — | — | — | — | — | — | — | — | — | — | — | — |
| | (c) | — | — | — | — | — | — | — | — | — | — | — | — | — | — |
| | (d) | — | — | — | — | — | — | — | — | — | — | — | — | — | — |
| F | (a) | — | — | — | — | — | — | — | — | — | — | — | — | — | — |
| | (b) | — | — | — | — | — | — | — | — | — | — | — | — | — | — |
| | (c) | — | — | — | — | — | — | — | — | — | — | — | — | — | — |
| | (d) | — | — | — | — | — | — | — | — | — | — | — | — | — | — |
| G | (a) | — | — | 5.6 | — | — | — | — | — | — | — | 4.8 | — | — | — |
| | (b) | — | — | 4.7 | — | — | — | — | — | — | — | 4.0 | — | — | — |
| | (c) | — | — | 4.9 | — | — | — | — | — | — | — | 3.0 | — | — | — |
| | (d) | — | — | 3.0 | — | — | — | — | — | — | — | 3.1 | — | — | — |
| H | (a) | — | — | — | — | — | — | — | — | — | — | — | — | — | — |
| | (b) | — | — | — | — | — | — | — | — | — | — | — | — | — | — |
| | (c) | — | — | — | — | — | — | — | — | — | — | — | — | — | — |
| | (d) | — | — | — | — | — | — | — | — | — | — | — | — | — | — |

The composite materials prepared in accordance with the present invention exhibited satisfactory results under all of the conditions employed. Rubber Composition Nos. 1 to 3, 7 to 9, and 13 to 18 enabled the preparation of composite materials that ensured satisfactory adhesion without employing any cobalt salt of organic acids. This advantage was especially noticeable when the rubber compositions specified above were combined with Steel Cord Samples C to F.

The composite material of the present invention ensures improved adhesion between a rubber material and a metal material throughout the period of its use including from the initial stage to after aging by heat or wet heat. In addition, this composite material solved all of the problems conventionally encountered during production such as environmental pollution and rubber scorching.

While the invention has been described in detail and with reference to specific embodiments thereof, it will be apparent to one skilled in the art that various changes and modifications can be made therein without departing from the spirit and scope thereof.

What is claimed is:

1. A composite material comprising a rubber composition and a metal material, wherein said rubber composition consists essentially of per 100 parts by weight of rubber, a cobalt salt of a carboxylic acid wherein said cobalt salt of said carboxylic acid contains 8 to 10 wt % of cobalt in said salt, and N-oxydiethylene-2-benzothiazolylsulfenamide or N-tert-butyl-2-benzothiazolylsulfenamide as a vulcanization accelerator, and said metal material is provided with a plating of a tertiary alloy consisting of 60 to 75% wt % copper, 4–10 wt % nickel, and the balance zinc; and wherein the cobalt salt of the carboxylic acid must be present in an amount of up to 0.5 parts by weight.

2. A composite material as claimed in claim 1, wherein said vulcanization accelerator is present in an amount of 0.5 to 2 parts by weight per 100 parts by weight of rubber.

* * * * *